(12) United States Patent
Schacht et al.

(10) Patent No.: US 11,933,370 B2
(45) Date of Patent: Mar. 19, 2024

(54) VEHICLE TRANSMISSION WITH DISCONNECT DEVICES

(71) Applicant: Dana Belgium N.V., Bruges (BE)

(72) Inventors: Filip D. Schacht, Meulebeke (BE); Kurt Cattoor, Koolkerke (BE)

(73) Assignee: DANA BELGIUM N.V., Bruges (BE)

( * ) Notice: Subject to any disclaimer, the term of this patent is extended or adjusted under 35 U.S.C. 154(b) by 51 days.

(21) Appl. No.: 17/342,438

(22) Filed: Jun. 8, 2021

(65) Prior Publication Data

US 2022/0389975 A1 Dec. 8, 2022

(51) Int. Cl.
| | |
|---|---|
| *B60K 17/35* | (2006.01) |
| *B60K 17/354* | (2006.01) |
| *B60W 10/02* | (2006.01) |
| *B60W 10/06* | (2006.01) |
| *B60W 10/08* | (2006.01) |
| *B60W 30/18* | (2012.01) |
| *F16D 25/08* | (2006.01) |
| *F16D 25/10* | (2006.01) |
| *F16D 48/02* | (2006.01) |
| *F16D 11/00* | (2006.01) |
| *F16D 121/04* | (2012.01) |
| *F16D 125/06* | (2012.01) |

(52) U.S. Cl.
CPC ............ *F16D 25/10* (2013.01); *B60K 17/354* (2013.01); *B60W 10/02* (2013.01); *B60W 10/06* (2013.01); *B60W 10/08* (2013.01); *B60W 30/18* (2013.01); *F16D 25/082* (2013.01); *F16D 25/14* (2013.01); *B60W 2710/022* (2013.01); *B60W 2710/06* (2013.01); *B60W 2710/08* (2013.01); *B60W 2710/1088* (2013.01); *F16D 2011/002* (2013.01); *F16D 2121/04* (2013.01); *F16D 2125/06* (2013.01); *F16D 2500/1026* (2013.01)

(58) Field of Classification Search
CPC ....... F16D 2011/002; F16D 2500/1026; F16D 2500/10456; F16D 2121/04; F16D 2125/58; F16D 2125/06; F16D 25/082; F16D 25/01; F16D 25/10; B60W 10/06; B60W 10/08; B60W 30/18; B60W 2710/022; B60W 2710/06; B60W 2710/08

See application file for complete search history.

(56) References Cited

U.S. PATENT DOCUMENTS

| | | |
|---|---|---|
| 5,098,352 A | 3/1992 | Montanaro et al. |
| 5,743,144 A | 4/1998 | Krantz |
| 6,079,539 A * | 6/2000 | Fetcho .................... F16D 11/10 192/85.53 |
| 8,100,207 B2 | 1/2012 | Oba et al. |
| 8,469,854 B1 | 6/2013 | Downs et al. |
| 9,193,263 B2 | 11/2015 | Ekonen et al. |
| 10,059,201 B2 | 8/2018 | Ekonen et al. |

(Continued)

*Primary Examiner* — Jacob S. Scott
*Assistant Examiner* — Farhana Pervin
(74) *Attorney, Agent, or Firm* — McCoy Russell LLP (57) ABSTRACT

Methods and systems for a vehicle transmission are provided herein. The vehicle transmission includes an input interface configured to mechanically couple to a motive power source. The vehicle transmission further includes a first disconnect device releasably mechanically coupling a first output to a first drive axle and a second disconnect device releasably mechanically coupling a second output to a second drive axle.

19 Claims, 5 Drawing Sheets

(56) References Cited

U.S. PATENT DOCUMENTS

| | | | |
|---|---|---|---|
| 10,882,512 B2 | 1/2021 | Kobler et al. | |
| 2010/0062891 A1* | 3/2010 | Ekonen | B60K 23/0808 |
| | | | 74/405 |
| 2013/0334000 A1* | 12/2013 | Gerauer | F16D 27/108 |
| | | | 192/69.7 |
| 2016/0039284 A1* | 2/2016 | Osborn | F16H 48/05 |
| | | | 180/245 |
| 2017/0144540 A1* | 5/2017 | Kincaid | F16D 11/14 |
| 2017/0284538 A1* | 10/2017 | Matsui | F16H 59/40 |
| 2018/0345787 A1* | 12/2018 | Niimi | F16D 13/52 |
| 2019/0061524 A1* | 2/2019 | Nozu | F16D 25/0638 |
| 2019/0257413 A1* | 8/2019 | Toyota | F16H 61/0031 |
| 2021/0341036 A1* | 11/2021 | Mock | F16D 11/00 |

\* cited by examiner

VEHICLE TRANSMISSION WITH DISCONNECT DEVICES

TECHNICAL FIELD

The present disclosure relates generally to a vehicle transmission with disconnect devices at the transmission's outputs and operating strategies for the disconnect devices.

BACKGROUND AND SUMMARY

In some vehicles, under selected conditions, such as while a vehicle is being towed by another vehicle, the vehicle transmission may not receive a desired amount of lubricant because the engine is shut-down and unable to drive lubricant pumps. During vehicle towing, transmission degradation may result from the persistent connection between the drive axle and the transmission. Because of the connection between the transmission and the drive axle energy inefficiencies may arise, under certain conditions. This superfluous energy consumption may be particularly undesirable in electric vehicles where energy efficiency may be favored over other characteristics. For instance, in transmissions which drive front and rear axles, energy efficiency may be decreased when only one of the axles is wanted for tractive purposes.

U.S. Pat. No. 5,743,144 A to Krantz teaches a hydrostatic transmission with a device that mechanically disconnects a drive axle from the transmission. To open and close the device, a motor rotor is used. Said motor rotor is operated via drive torque hydraulically transferred from the transmission.

The inventors have recognized several drawbacks with Krantz's transmission disconnect system as well as other disconnect devices. For instance, Krantz's disconnect device uses drive torque hydraulically transferred from the hydrostatic transmission to operate which may decrease the disconnect device's window for operation. Furthermore, Krantz's transmission only attaches to a single drive axle, thereby constraining drivetrain performance. Moreover, Krantz's disconnect device demands the exertion of a biasing force on a spring to keep the device disengaged.

The inventors have recognized the abovementioned issues and developed a vehicle transmission to overcome at least a portion of the challenges. The vehicle transmission includes an input interface configured to mechanically couple to a motive power source. The vehicle transmission further includes a first disconnect device releasably mechanically coupling a first output to a first drive axle and a second disconnect device releasably mechanically coupling a second output to a second drive axle. In this way, the transmission may be provided with two disconnect devices to strategically disconnect one of the two axles during some operating conditions such as when only one axle receives power from the transmission. Consequently, the transmission's efficiency may be increased due to a reduction in drivetrain wind-up and the resultant energy consuming wheel slip. Further, the cost of vehicle ownership may be reduced due to the decrease tire wear that stems from the reduction in wheel slip, during certain operating conditions.

In another example, a vehicle transmission is provided that includes a disconnect device. In this example, the disconnect device includes a splined sleeve mated with an output shaft that is configured to rotationally couple to a drive axle. The disconnect device further includes a hydraulic actuation system with a hydraulic actuator coupled to the splined sleeve. Further, the hydraulic actuator is configured to axially translate the splined sleeve in opposing directions to place the hydraulic actuator in an engaged configuration and a disengaged configuration. In the engaged configuration, the splined sleeve mates with a splined transmission shaft. Additionally, the hydraulic actuation system is configured to automatically transition the hydraulic actuator into the disengaged configuration responsive to a hydraulic pressure in the hydraulic actuation system decreasing below a threshold value. In this way, the axle may be passively disconnected during selected operating conditions, such as when the vehicle is being towed by another vehicle. Consequently, the chance of transmission degradation is decreased due to the chance of the transmission being inadvertently connected to the drive axle, during towing, being drastically reduced. Further, by placing the disconnect system near the outputs of the transmission, the transmission's manufacturing process, may be simplified, if desired. For instance, the disconnect system may be efficiently incorporated into an existing transmission architecture by replacing an output section with the add-on disconnect system.

Further in one example, the hydraulic pressure to activate the disconnect device may be supplied by a regulator valve that may be used in the transmission for other hydraulic components, such as hydraulically operated clutches. The cost and complexity of the transmission system may therefore be reduced due to the dual-use functionality of the regulator valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-4 are drawn approximately to scale. However, other relative component dimensions may be used, in other embodiments.

DETAILED DESCRIPTION

A vehicle transmission with one or more disconnect devices that rotationally decouple the transmission's outputs from drive axles is described herein. The disconnect device is designed to automatically open when the pressure in a hydraulic actuation system drops below a threshold pressure. The hydraulic actuation system, may use pressurized fluid from an internal combustion engine or other suitable motive power source. Therefore, the disconnect devices may responsively open, when the engine shuts down. Using the engine's existing hydraulics for disconnect device control allows the transmission to be simplified and a dedicated electrical motor which powers the disconnect devices to be omitted from the system, if wanted. The automatic disconnect of the transmission from the drive axles during engine shut-down enables wear on the transmission to be avoided, when the vehicle is being towed by another vehicle, for example. Further, the transmission may include multiple disconnect devices that are designed to selectively disconnect the transmission from different drive axles. When multiple disconnect devices are used in the transmission, one of the disconnect devices may be actively controlled when only one axle is wanted for traction. Efficiency gains may be leveraged from the active disconnect device control strategy. The active disconnect device control strategy further enables tire wear to be reduced by avoiding driveline wind-up that may result in wheel slippage, thereby reducing the vehicle's cost of ownership. The energy efficiency gains may be particularly desirable in electric vehicles (EVs) where efficient power management may be more favored than in vehicles with internal combustion engines, for instance.

Figure 1:
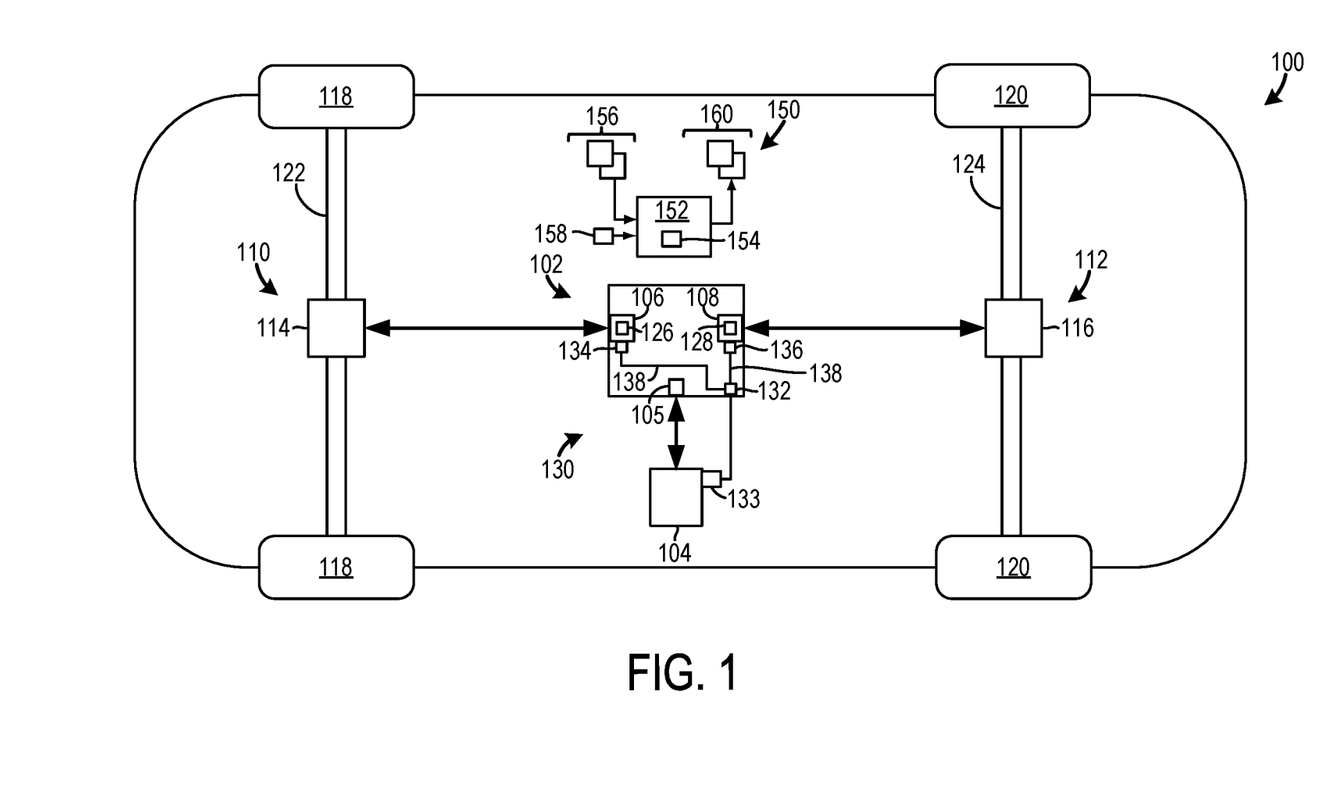
FIG. 1 shows a vehicle with a transmission.

A vehicle 100 is depicted in FIG. 1 with a transmission 102. The vehicle 100 may be a light, medium, or heavy duty vehicle. Further, the transmission 102 may be a power-split type transmission where the transmission is designed to provide power to the drive wheels from both a traction motor and an internal combustion engine, during certain operating conditions. In such an example, the transmission may be a continuously variable transmission that is capable of smoothly transitioning through a continuous number of gear ratios within a predetermined range. In other examples, the transmission 102 may be a powershift type transmission. As such, the powershift transmission may include multiple clutches designed to automatically shift between discrete gear ratios. In yet another example, the transmission 102 may be a hydrostatic transmission with a hydraulic pump and a hydraulic motor that use hydraulic pressure to drive rotation of the outputs of the transmission.

The transmission 102 may be rotationally coupled to a motive power source 104. The motive power source 104 may include an internal combustion engine and/or a traction motor. As such, the vehicle may be configured as an EV, a hybrid electric vehicle (HEV), or a vehicle using solely an internal combustion engine. The internal combustion engine may include conventional components such as cylinders, pistons, intake valves, exhaust valves, a fuel delivery system, and the like, to permit the engine to perform combustion cycles. The traction motor may include conventional components such as a rotor, a stator, and the like. To facilitate the rotational attachment between the transmission and the motive power source, an input interface 105 may be provided in the transmission. The input and output of the transmission are indicated with regard to a drive mode. However, during coasting, or regeneration in the case of an EV or HEV, power may flow from the transmission back to the motive power source.

The transmission 102 may additionally include a first output interface 106 and/or a second output interface 108. The output interfaces 106, 108 are designed to rotationally attach to drive axles 110, 112, respectively. Suitable mechanical structures may be provided in the output interfaces such as flanges, splines, bolts, plates, combinations thereof, and the like. Further, mechanical components such a drive shafts, gears, belts, chains, and the like may be used to transfer power from the output interfaces to the differentials in the drive axles. The drive axles 110, 112 may include differentials 114, 116 coupled to drive wheels 118, 120 via axle shafts 122, 124. The differentials 114, 116 may be open differentials, locking differentials, limited slip differentials, etc.

A first disconnect device 126 is coupled to the first output interface 106. The first disconnect device 126 is designed to selectively mechanically couple a transmission shaft to the first output interface. A second disconnect device 128 may be coupled to the second output interface 108. Similar to the first disconnect device, the second disconnect device is designed to selectively mechanically couple a transmission shaft to the second output interface 108. In other words, both of the disconnect devices may releasably mechanically couple the transmission to corresponding drive axles.

Figure 3:
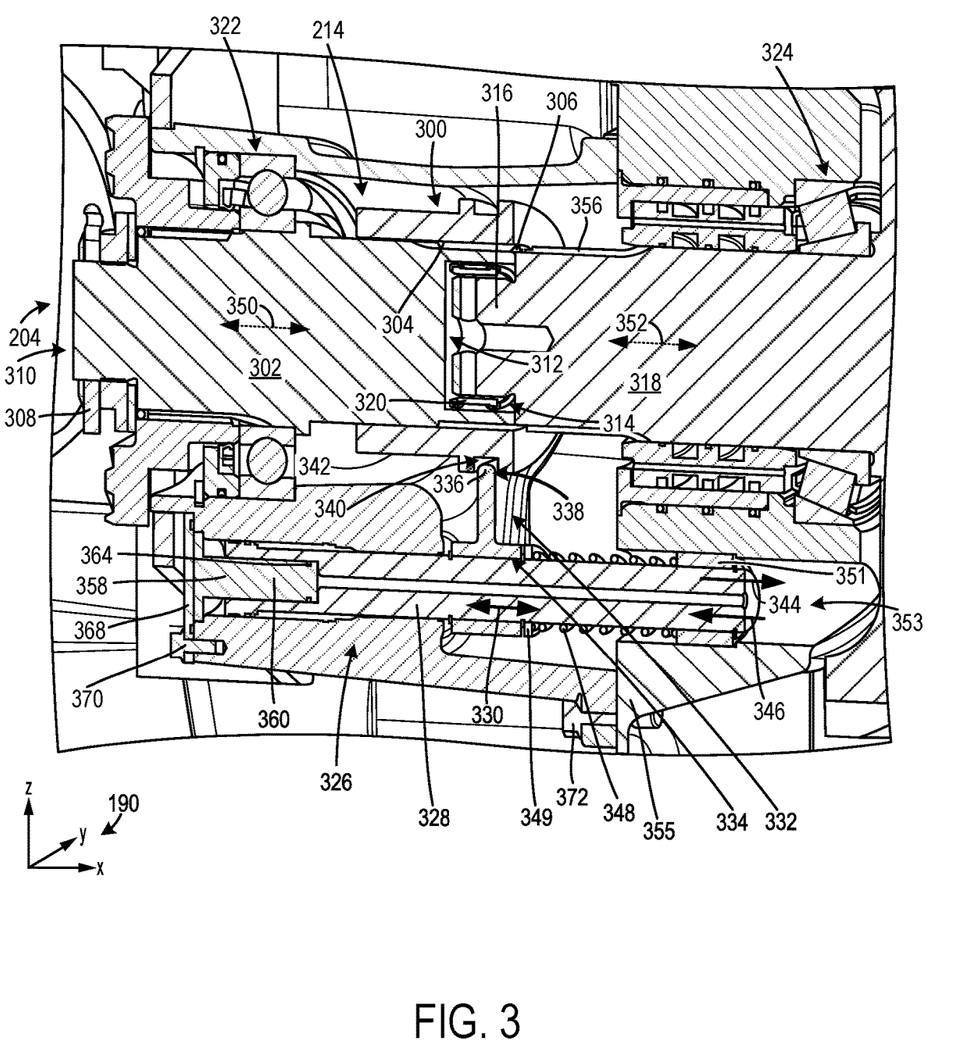
FIG. 3 shows a detailed cross-sectional view of a disconnect device of the transmission system, depicted in FIG. 2, in a disengaged configuration.
Figure 4:
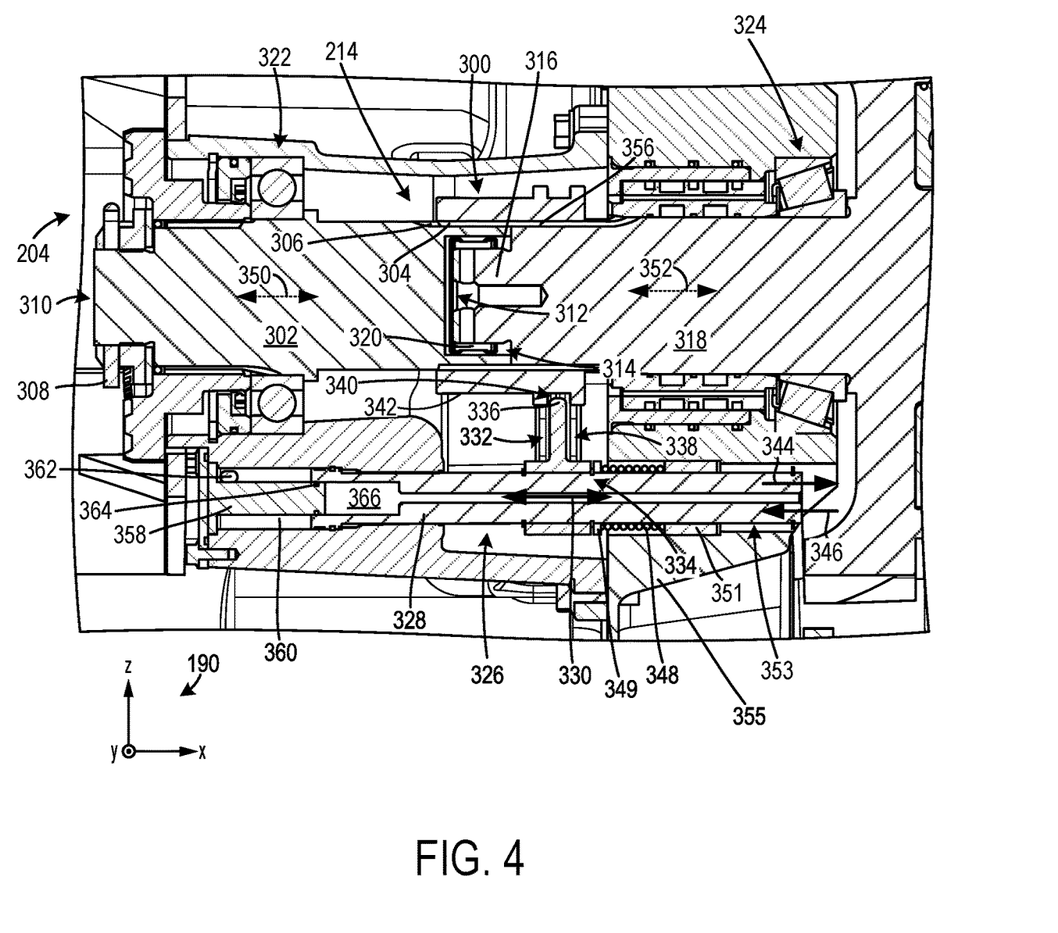
FIG. 4 shows a detailed cross-sectional view of the disconnect device in the transmission system, depicted in FIG. 2, in an engaged configuration.

The first and second disconnect devices 126, 128 may have a similar design, in one example. FIGS. 3-4 depict a detailed illustration of an exemplary disconnect device, described in greater detail herein.

A hydraulic actuation system 130 for the disconnect devices 126, 128 is further provided in the transmission. The hydraulic actuation system 130 may supply pressurized hydraulic fluid (e.g., oil) to actuators of the first and second disconnect devices 126, 128. The hydraulic actuation system 130 may include a regulator pressure valve 132 included in the transmission 102. The regulator pressure valve 132 may receive pressurized fluid from a pump 133 that is driven by the motive power source 104. Further, the regulator pressure valve 132 may be in fluidic communication with selector valves (e.g., solenoid valves) 134, 136 of the first and second disconnect devices 126, 128. Hydraulic lines 138 therefore extend between the regulator pressure valve 132 and the selector valves 134, 136. The selector valves 134, 136 may be arranged in at least an open and a closed state that permits and inhibits disconnect device engagement and disengagement. In turn, the selector valves may be hydraulically coupled to hydraulic actuators in the disconnect devices 126, 128, described in greater detail herein with regard to FIGS. 2-4. The selector valve may specifically be controlled by a transmission control unit (TCU) described in greater detail herein to de-activate the disconnect system.

The vehicle 100 may further include a control system 150 with a transmission control unit (TCU) 152 as shown in FIG. 1. The control system may include other controllers such as a vehicle control unit (VCU), an engine control unit (ECU), and the like. The TCU 152 may include a microcomputer 154 with components such as a processor (e.g., microprocessor unit), input/output ports, an electronic storage medium for executable programs and calibration values (e.g., a read-only memory chip, random access memory, and/or keep alive memory), a data bus, and the like. The storage medium (e.g., memory) may be programmed with computer readable data representing instructions executable by the processor for performing the methods and control techniques described herein as well as other variants that are anticipated but not specifically listed.

The TCU 152 may receive various signals from sensors 156 coupled to various regions of transmission 102 or the vehicle 100, more generally, in some cases. For example, the sensors 156 may include a speed sensor coupled to the motive power source, a pedal position sensor designed to detect depression of an operator-actuated pedal, such as an accelerator pedal or a brake pedal, speed sensors at the vehicle wheels 118, 120, an ambient temperature sensor, a temperature sensor coupled to the transmission 102, etc. An input device 158 (e.g., accelerator pedal, brake pedal, combinations thereof, etc.) may further provide input signals indicative of an operator's intent for vehicle control.

Upon receiving the signals from the various sensors 156 of FIG. 1, the TCU 152 processes the received signals, and employs various actuators 160 of vehicle components to adjust the components based on the received signals and instructions stored on the memory of the TCU 152. For example, the TCU may send commands to the regulator valve 132, and responsive to receiving the command an actuator in the valve may be adjusted to vary the pressure supplied to downstream components. In another example, the TCU may send control commands to one or both of the selector valves 134, 136 to cause actuator adjustment which allows or inhibits hydraulic fluid flow to the corresponding disconnect device. The other controllable components in the transmission may function in a similar manner.

Figure 2:
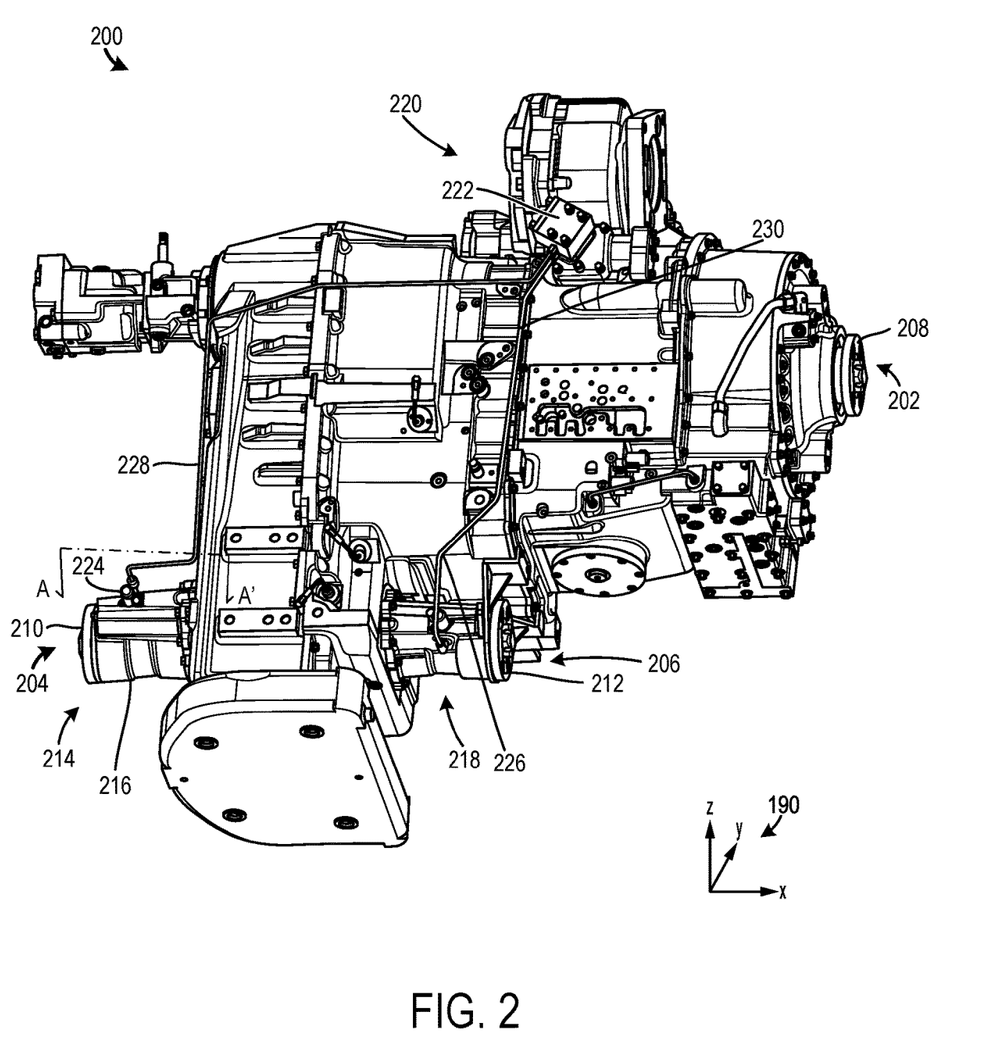
FIG. 2 shows a perspective view of a transmission system.

An axis system 190 is provided in FIG. 1, as well as FIG. 2-4, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows a detailed illustration of an exemplary transmission 200. The transmission 200 may be included in a vehicle such as the vehicle 100 shown in FIG. 1. Therefore, the transmission 200 may have at least some common structural and functional features with the transmission 102, shown in FIG. 1. For instance, the transmission 200 includes an input interface 202, a first output interface 204, and/or a second output interface 206. Redundant description of the overlapping structural and functional characteristics of the components in the transmission systems, shown in FIGS. 1 and 2, is omitted for concision. The output interfaces 204, 206 may be coaxially arranged, in some examples. The coaxial output interface arrangement may permit the transmission to be efficiently connected to the drive axles, although other output interface positions may be used, in other embodiments. Further, the input interface 202 may be axially offset from the output interfaces 204, 206, providing a targeted amount of transmission drop. However, in other arrangements at least one of the output interfaces may be coaxially arranged with the input interface.

The input interface 202 and the output interfaces 204, 206 are illustrated with flanges 208, 210, 212, respectively to facilitate efficient attachment to upstream and downstream components via mechanical attachment devices (e.g., bolts, screws, and the like). Specifically, the output interface flanges may be connected to mechanical components that are attached to vehicle drive axles.

The transmission 200 includes a first disconnect device 214 designed to selectively rotationally couple and decouple the output interface 204 from a transmission shaft. As described herein, engagement of the disconnect device denotes the mechanical attachment between the transmission and the components providing power to the drive axle. Conversely, disengagement of the disconnect device denotes the mechanical decoupling of the transmission and the components providing power to the drive axle. In other words, during disengagement of the disconnect device, the corresponding drive axle may rotate freely with regard to the transmission.

It will be appreciated that the transmission shaft to which the disconnect device 214 is attached may be rotationally coupled to upstream transmission components and more generally the transmission's input. Specifically, as illustrated, the first disconnect device 214 is enclosed in a housing section 216. Cross-sectional views of the first disconnect device 214 are illustrated in FIGS. 3-4 and described in greater detail herein. The transmission may further include a second disconnect device 218. The second disconnect device 218 is designed to rotationally couple and decouple the output interface 206 from another transmission shaft. In this way, multiple drive axles may be rotationally coupled and decoupled from the transmission during different operating conditions.

A hydraulic actuation system 220 may be provided in the transmission to trigger engagement and disengagement of the disconnect devices 214, 218. The hydraulic actuation system 220 may include a regulator valve 222 that supplies hydraulic fluid (e.g., oil) to selector valves 224, 226 via hydraulic lines 228, 230. The selector valves 224, 226, as illustrated, are coupled to an exterior of the transmission's housing adjacent to the associated disconnect devices. However, in other examples, one or both of the selector valves may be hydraulically coupled to the corresponding disconnect device, but mounted in a different location in the hydraulic line, such as in a location closer to the regulator valve and spaced away from the corresponding disconnect device. The regulator valve 222 may further be designed to control operation of other hydraulic components in the transmission, such as wet friction clutches. To elaborate, the regulator valve 222 may control the pressure of the hydraulic fluid provided to clutches in the transmission for shifting operation, for instance. The regulator valve 222 may be in fluidic communication with a pump that is driven by the motive power source. Cutting plane A-A' indicates the location of the cross-sectional views illustrated in FIGS. 3-4.

FIGS. 3 and 4 show detailed views of the first disconnect device 214 in a disengaged and an engaged configuration, respectively. In the disengaged configuration, depicted in FIG. 3, power transfer between the transmission and the first drive axle by way of the output interface 204 is inhibited. On the other hand, in an engaged configuration, depicted in FIG. 4, power transfer between the transmission 200 and the first drive axle by way of the input interface 204 is permitted.

The first disconnect device 214 may include a splined sleeve 300. The splined sleeve 300 is coupled to an output shaft 302 of the output interface 204 via spline engagement between the sleeve and the shaft. To elaborate, the splined sleeve 300 may include interior splines 304 that mate with exterior splines 306 in the output shaft 302. These splines axially traverse the sleeve and the shaft. As described herein, splines include ridges and grooves.

A flange 308 may reside at one end 310 of the output shaft 302 to enable the transmission to mechanically couple to a drive axle. The other end 312 of the output shaft 302 may include a recess 314 designed to mate with an extension 316 of a transmission shaft 318. A bearing 320 (e.g., a roller bearing such as a needle roller bearing) may be positioned between the extension of the transmission shaft 318 and the output shaft 302 to allow for rotation therebetween when the disconnect device is disengaged. As described herein, a bearing may generally include an inner race, an outer race, and roller elements (e.g., cylinders, balls, tapered cylinders, etc.) positioned between the races.

A bearing (e.g., ball bearing) 322 may be coupled to the output shaft 302. Further, a bearing 324 (e.g., tapered roller bearing) may be attached to the transmission shaft 318. The sleeve 300 may be axially positioned between the bearing 322 and the bearing 324, to increase transmission compactness. However, other bearing and sleeve arrangements that may be less compact can be used, in other embodiments.

The disconnect device 214 may further include a hydraulically operated actuator 326. The hydraulic actuator 326 includes a piston (e.g., a rod) 328 that is designed to axially translate in opposing axial directions 330. A fork 332 may be coupled to the actuator piston 328. The fork 332 specifically may circumferentially surround and be fixedly coupled to the piston 328 at a first end 334. A protrusion 336 may reside on the first second end 338. The protrusion 336 mates with a recess 340 in an exterior surface 342 of the sleeve 300. This connection between the fork 332 and the sleeve 300 allows the actuator's axial movement to be translated into axial sleeve movement. Thus, when the actuator's piston 328 move axially in direction 344, the sleeve 300 may correspondingly move in a similar axial direction. The direction 344 may be an engagement direction. Conversely, the piston's movement in the opposite direction 346 may be a disengagement direction.

The hydraulic actuator 326 may further include a spring 348. The spring 348 is designed to exert a return force on the piston 328 when the disconnect device 214 is engaged. The spring 348 may be axially delimited at one end by a ring 349 fixedly coupled to the piston 328. Further, the ring 349 may be positioned axially interior to the fork 332 to permit the spring to be compactly incorporated into the hydraulic actuator. However, other positions of the ring and the spring may be used, in other examples. Additionally, a bushing 351 may reside in a recess 353 of a housing 355 of the actuator 326. During actuation of the piston 328, the position of the bushing 351 may remain substantially fixed, which permits compression and decompression of the spring 348, during disconnect device engagement and disengagement.

The hydraulic actuator 326 may include a pin 358 fixedly coupled to the housing 355 of the actuator. A hydraulic chamber 360 may be provided in the actuator that is in fluidic communication with the selector valve 224, shown in FIG. 2, via an opening 362, shown in FIG. 4, shown in FIG. 4. Increasing the pressure of the fluid in the chamber 360 increases the axial force applied to the piston 328 in the axial direction 344. A seal 364 may be coupled to the pin 358 to seal the hydraulic chamber 360. The pin 358 resides in a cavity 366 in the piston 328. The mated engagement between the pin and the cavity guides axial movement of the piston during engagement and disengagement of the disconnect device. Additionally, the rotational axes 350, 352 of the output shaft 302 and the transmission shaft 318 are provided for reference and may be coaxial.

FIG. 3 specifically depicts the disconnect device 214 in the disengaged configuration. To transition the disconnect device 214 into the disengaged configuration, the pressure in the hydraulic chamber 360 may be decreased below a threshold value. Responsive to the drop in hydraulic chamber pressure, the spring 348 pushes the piston 328 in direction 346 which causes the fork 332 to move the sleeve 300 such that it decouples from splines 356 in the transmission shaft 318. The threshold pressure therefore may correspond to a spring constant of the spring 348. The characteristics of the spring may therefore be chosen to achieve a desired threshold engagement pressure. Further, during disconnect device disengagement, the cavity 366 of the piston 328, shown in FIG. 4, further encloses the pin 358 while the spring 348 decompresses, due to the piston moving axially away from the bushing 351. Thus, as shown in FIG. 3, the splines 304 in the splined sleeve 300 are decoupled from the splines 356 in the transmission shaft 318. In the disengaged configuration, the spring is decompressed and the hydraulic pressure applied to the hydraulic actuator 326 is below the threshold value. In this way, the disconnect device may passively remain disconnected.

The disconnect device 214 may be automatically placed in the disengaged configuration when the pressure of the hydraulic fluid supplied to the hydraulic actuator 326 is decreased, due to the hydraulic pump driven by the engine or motor being shut-down, for instance. In this way, the transmission may be disconnected from the drive axles, during vehicle towing, for example, thereby decreasing transmission wear and circumventing potential transmission component degradation that stems from a lack of component lubrication, during engine shut-down. Conversely, during engine starting, the disconnect devices may be engaged to permit the vehicle to have full traction during launch. Hydraulically operating the disconnect devices using fluid pressurized by the engine or motor allows the system to dispense with an electric motor for actuating the disconnect devices, if wanted. Consequently, the cost and complexity of the system may be reduced.

Further in certain examples, to actively induce disengagement of the disconnect device 214 or the other disconnect device 218, depicted in FIG. 2, the TCU may adjust the selector valve 224, shown in FIG. 2, to decrease the pressure of the hydraulic fluid delivered to the hydraulic actuator 326. The active disengagement of the disconnect device may be carried out when solely one of the drive axles is desired for traction. In this way, transmission efficiency is increased while decreasing transmission wear.

Further, as shown in FIG. 3, the hydraulic actuator 326 may be axially offset from the output shaft 302 and the transmission shaft 318, to increase transmission compactness. Additionally, a plate 368 may be coupled to the housing 355 via attachment devices 370 to secure the pin 358 therein. Further, the pin 358 and the plate 368 may be positioned radially outward from the flange 308 to enable the hydraulic actuator to be efficiently installed and accessed during transmission servicing and repair, for instance. However, other housing configurations have been contemplated. Further, the housing 355 may be formed in sections that are secured via attachment devices 372, although a monolithic housing structure may be used, in other embodiments.

The bearings 324 may be coupled to a section of the housing 355 adjacent to the recess 353 and the bearing 322 may be attached to a section of the housing 355 adjacent to the piston 328. In this way, the output shaft 302 and the transmission shaft 318 may be able to independently rotate with regard to the hydraulic actuator 326.

FIG. 4 specifically depicts the disconnect device 214 in the engaged configuration. To transition the disconnect device 214 into the engaged configuration. The pressure in the hydraulic chamber 360 may be increased via operation of the selector valve 224 in conjunction with the regulator valve 222. When the pressure in the hydraulic chamber 360 surpasses the actuation threshold, the piston 328 moves in axial direction 344. Responsive to the piston movement, the sleeve 300 also moves axially away from the output interface 204. As the sleeve 300 moves in the engagement direction, the sleeve's interior splines 304 mate with the splines 356 in the transmission shaft 318. As such, when the disconnect device is engaged, the sleeve 300 mates with splines in both the output shaft 302 and the transmission shaft 318, thereby mechanically coupling the transmission to the drive axle. The second disconnect device 218, shown in FIG. 2, may function in a similar manner to the first disconnect device 214, described with regard to FIGS. 3-4, and therefore may include similar components. Further, in some embodiments, the TCU may be designed to actively control both disconnect devices independently to allow one of the disconnect devices to be decoupled from the corresponding drive axle while the other remains engaged, as discussed in greater detail herein with regard to FIG. 5.

Figure 5:
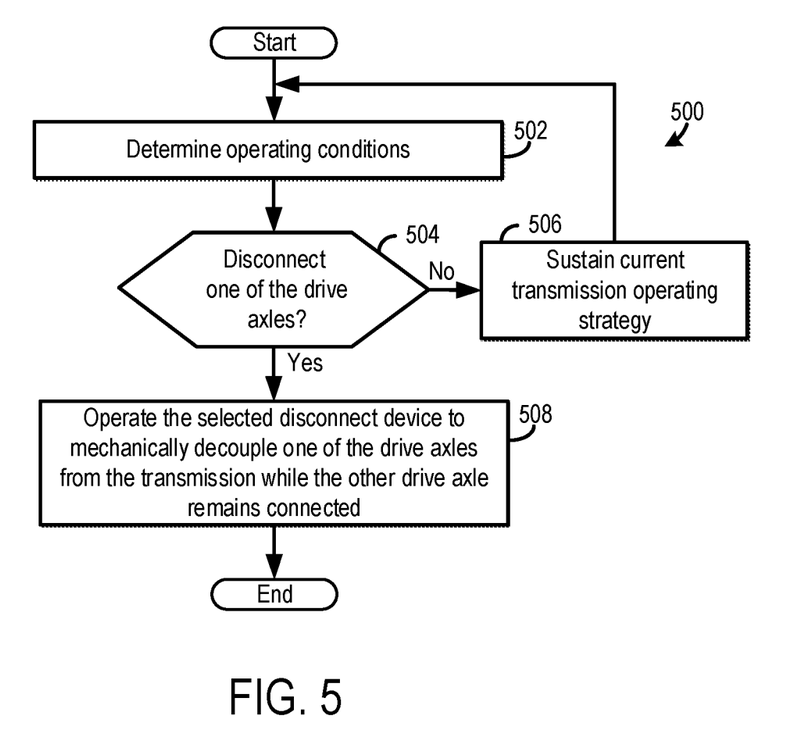
FIG. 5 shows a method for operation of a transmission system.

FIG. 5 shows a method 500 for operation of disconnect devices in a transmission. The method 500 may be carried out by the transmissions and corresponding components described above with regard to FIGS. 1-4. However, in other examples, the method 500 may be implemented using other suitable transmissions and components. Specifically, the method may be carried out as instructions stored in memory executed by a processor in TCU. As such, performing the method steps may include sending and/or receiving commands which trigger adjustment of associate components, as previously indicated.

At 502, the method includes determining operating conditions. The operating conditions may include transmission input speed, transmission output speed, engine speed, motor speed, ambient temperature, vehicle speed, vehicle load, and the like. These operating conditions may be determined via sensor inputs and/or modelling.

At 504, the method judges whether or not to mechanically disconnect one of the drive axles from the transmission. This judgement may be carried out based on operator input with a drivetrain axle selector. For instance, an operator may select single axle drive using an input device. When the single axle drive is selected, the mechanical disconnect sequence using the disconnect device may be initiated. In some examples, the disconnect device may demand that transmission is at zero output torque to initiate disconnect device engagement or disengagement. However, in other examples, the disconnect devices may be designed to function while the transmission's output speed is non-zero.

If it is judged that disconnection of one of the drive axles from the transmission is not desired (NO at 504) the method moves to 506 where the method includes maintaining the current transmission operating strategy. For instance, the disconnect devices in the transmission may remain in engaged configurations where the drive axles are mechanically coupled to the transmission outputs.

Conversely, if it is judged that disconnection of one of the drive axles from the transmission is desired (YES at 504) the method moves to 508. At 508, the method includes operating the selected disconnect device to mechanically decouple one of the drive axles from the transmission while the other drive axle remains connected to the transmission. For instance, the regulator and selector valves may be operated to increase the pressure provided to the disconnect device's hydraulic actuator. In this way, transmission efficiency may be increased.

The technical effect of the transmission operating method described herein is to decrease transmission wear and increase transmission efficiency by disconnecting the drive axles from the transmission when traction from the corresponding drive axle is not demanded, such as during vehicle towing or when only one of the drive axles is used for traction.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle transmission is provided that includes an input interface configured to mechanically couple to a motive power source; a first disconnect device releasably mechanically coupling a first output to a first drive axle; and a second disconnect device releasably mechanically coupling a second output to a second drive axle.

In another aspect, a vehicle transmission is provided that includes a first disconnect device including: a splined sleeve mated with a first output shaft that is configured to rotationally couple to a first drive axle; and a hydraulic actuation system including a hydraulic actuator coupled to the splined sleeve, wherein the hydraulic actuator is configured to axially translate the splined sleeve in opposing directions to place the hydraulic actuator in an engaged configuration and a disengaged configuration; wherein in the engaged configuration the splined sleeve mates with a splined transmission shaft; and wherein the hydraulic actuation system is configured to automatically transition the hydraulic actuator into the engaged configuration responsive to a hydraulic pressure in the hydraulic actuation system decreasing below a threshold value.

In yet another aspect, a method for operation of a vehicle transmission is provided that comprises automatically operate a first disconnect device to mechanically decouple a first drive axle from the vehicle transmission when a pressure in a hydraulic actuation system coupled to the first disconnect device decreases below a threshold value; wherein the first disconnect device includes a splined sleeve mated with a first output shaft that is configured to rotationally couple to a first drive axle; wherein the hydraulic actuation system comprises a hydraulic actuator coupled to the splined sleeve; and wherein the hydraulic actuator is configured to axially translate the splined sleeve in opposing directions to place the hydraulic actuator in an engaged configuration and a disengaged configuration. The method may further comprise shutting down a motive power source to decrease the pressure in the hydraulic actuation system, in one example.

In any of the aspects or combinations of the aspects, the disconnect device may include a spring loaded piston that is compressed in an engaged position.

In any of the aspects or combinations of the aspects, the motive power source may be an internal combustion engine or an electric motor.

In any of the aspects or combinations of the aspects, the hydraulic pressure in the hydraulic actuation system may be supplied by a regulator pressure valve included in the vehicle transmission.

In any of the aspects or combinations of the aspects, the first disconnect device and the second disconnect device may be each hydraulically actuated.

In any of the aspects or combinations of the aspects, the first disconnect device and the second disconnect device may be configured to receive pressurized fluid from a regulator valve of the vehicle transmission.

In any of the aspects or combinations of the aspects, the first disconnect device may include a first sleeve that has a plurality of interior splines configured to selectively mechanically engage counterpart exterior splines in a shaft of the first output and a transmission shaft.

In any of the aspects or combinations of the aspects, in the engaged configuration of the hydraulic actuator, a hydraulic pressure may maintain a hydraulic cylinder in an engaged position and a spring exerts a return force on the hydraulic cylinder.

In any of the aspects or combinations of the aspects, the hydraulic actuation system may be in fluidic communication with a hydraulic assembly driven by an internal combustion engine or a traction motor; and responsive to a hydraulic pressure in the hydraulic assembly decreasing below a disconnect threshold value, a selector valve in the hydraulic actuation system may change to a disengagement state that initiates the transition of the hydraulic actuator from the engaged configuration to the disengaged configuration.

In any of the aspects or combinations of the aspects, the vehicle transmission may further comprise a transmission control unit (TCU) including instructions that when executed cause the TCU to: adjust the state of the selector valve based on one or more operating conditions in the vehicle transmission.

In any of the aspects or combinations of the aspects, the selector valve may be a solenoid valve.

In any of the aspects or combinations of the aspects, the hydraulic pressure in the hydraulic actuation system may be supplied by a regulator pressure valve included in the vehicle transmission.

In any of the aspects or combinations of the aspects, the vehicle transmission may further comprise a second disconnect device that may include: a splined sleeve mated with a second output shaft configured to rotationally couple to a second drive axle; and a hydraulic actuation system including a hydraulic actuator coupled to the splined sleeve and configured to axially translate the splined sleeve in opposing directions to place the hydraulic actuator in an engaged configuration and a disengaged configuration, wherein in the engaged configuration the splined sleeve mates with a splined transmission shaft.

In any of the aspects or combinations of the aspects, the vehicle transmission may further comprise a transmission control unit (TCU) including instructions that when executed cause the TCU to: disengage one of the first and second disconnect devices based on one or more operating conditions in the vehicle transmission.

In any of the aspects or combinations of the aspects, the vehicle transmission may further comprise an input interface configured to rotationally couple to an internal combustion engine.

In any of the aspects or combinations of the aspects, the vehicle transmission may further comprise an input interface configured to rotationally couple to a traction motor.

In any of the aspects or combinations of the aspects, the splined sleeve may include a plurality of splines on an interior surface and the splined transmission shaft includes a plurality of splines on an exterior surface.

In any of the aspects or combinations of the aspects, the sun gear may be splined, bolted, and/or welded to a section of the housing.

In another representation, a vehicle transmission assembly is provided that comprising a first disconnect mechanism and a second disconnect mechanism that are each designed to disconnect the transmission assembly from a first and a second drive axle when a pressure supplied to the disconnect mechanisms via a pump coupled to an engine or an electric motor decreases below a threshold value.

Note that the example control and estimation routines included herein can be used with various powertrain, electric drive, engine, and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the terms "substantially" and "approximately" are construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle transmission, comprising:
   an input interface configured to mechanically couple to a motive power source;
   a first disconnect device configured to selectively inhibit mechanical power transfer from a first transmission shaft to a first output interface, wherein the first output interface is configured to rotationally couple to a first differential in a first drive axle via one or more mechanical components that extend between the first output interface and the first differential; and
   a second disconnect device configured to selectively inhibit mechanical power transfer from a second transmission shaft to a second output interface, wherein the second output interface is configured to rotationally couple to a second differential in a second drive axle via one or more mechanical components that extend between the second output interface and the second differential;
   wherein the first and second drive axles are spaced away from one another; and
   wherein the first disconnect device and the second disconnect device are both commonly enclosed in a transmission housing.

2. The vehicle transmission of claim 1, wherein the first disconnect device and the second disconnect device are each hydraulically actuated.

3. The vehicle transmission of claim 1, wherein the first disconnect device and the second disconnect device are configured to receive pressurized fluid from a regulator valve of the vehicle transmission.

4. The vehicle transmission of claim 1, wherein:
   the first disconnect device includes a first sleeve that has a plurality of interior splines configured to selectively mechanically engage counterpart exterior splines in a first output shaft and the first transmission shaft; and
   the first output shaft is directly rotationally coupled to the first output interface.

5. A vehicle transmission, comprising:
   a first disconnect device including:
      a first splined sleeve mated with a first output shaft that is configured to selectively rotationally decouple the first output shaft from a first transmission shaft, wherein a first output interface is directly rotationally coupled to the first output shaft and wherein the first output interface is configured to rotationally couple to a first differential in a first drive axle via one or more mechanical components that extend between the first output interface and the first differential; and
      a hydraulic actuation system including a hydraulic actuator coupled to the first splined sleeve, wherein the hydraulic actuator is configured to axially translate the first splined sleeve in opposing directions to place the hydraulic actuator in an engaged configuration and a disengaged configuration;
   a second disconnect device including:
      a second splined sleeve mated with a second output shaft configured to rotationally couple to a second differential in a second drive axle via one or more mechanical components that extend between a second output interface and the second differential; and
      wherein the hydraulic actuation system includes a second hydraulic actuator coupled to the second splined sleeve and configured to axially translate the second splined sleeve in opposing directions to place the second hydraulic actuator in an engaged configuration and a disengaged configuration, wherein in the engaged configuration the second splined sleeve mates with splines in a second transmission shaft;
   wherein the first and second drive axles are spaced away from one another;
   wherein, in the engaged configuration, the first splined sleeve mates with splines in the first transmission shaft;
   wherein the hydraulic actuation system is configured to automatically transition the hydraulic actuator into the disengaged configuration responsive to a hydraulic pressure in the hydraulic actuation system decreasing below a threshold value;
   wherein the first output shaft and the first disconnect device are enclosed within a transmission housing; and
   wherein the first disconnect device and the second disconnect device are both commonly enclosed in the transmission housing.

6. The vehicle transmission of claim 5, wherein, in the engaged configuration of the hydraulic actuator, a hydraulic pressure maintains a hydraulic cylinder in an engaged position and a spring exerts a return force on the hydraulic cylinder.

7. The vehicle transmission of claim 6, wherein:
   the hydraulic actuation system is in fluidic communication with a hydraulic assembly driven by a traction motor; and
   responsive to a hydraulic pressure in the hydraulic assembly decreasing below a disconnect threshold value, a selector valve in the hydraulic actuation system changes to a disengagement state that initiates the transition of the hydraulic actuator from the engaged configuration to the disengaged configuration.

8. The vehicle transmission of claim 7, further comprising a transmission control unit (TCU) including instructions that when executed cause the TCU to:
   adjust the state of the selector valve based on one or more operating conditions in the vehicle transmission.

9. The vehicle transmission of claim 7, wherein the selector valve is a solenoid valve.

10. The vehicle transmission of claim 5, wherein the hydraulic pressure in the hydraulic actuation system is supplied by a regulator pressure valve included in the vehicle transmission.

11. The vehicle transmission of claim 5, further comprising a transmission control unit (TCU) including instructions that when executed cause the TCU to:

disengage one of the first and second disconnect devices based on one or more operating conditions in the vehicle transmission.

12. The vehicle transmission of claim 5, further comprising an input interface configured to rotationally couple to an internal combustion engine.

13. The vehicle transmission of claim 5, further comprising an input interface configured to rotationally couple to a traction motor.

14. The vehicle transmission of claim 5, wherein the splined sleeve includes a plurality of splines on an interior surface and the first transmission shaft includes a plurality of splines on an exterior surface.

15. A method for operation of a vehicle transmission, comprising:
automatically operating a first disconnect device to mechanically decouple a first drive axle from the vehicle transmission when a pressure in a hydraulic actuation system coupled to the first disconnect device decreases below a threshold value;
wherein the vehicle transmission includes:
a second disconnect device configured to selectively inhibit mechanical power transfer from a second transmission shaft to a second output interface, wherein the second output interface is configured to rotationally couple to a second differential in a second drive axle via one or more mechanical components that extend between the second output interface and the second differential;
wherein the first and second drive axles are spaced away from one another;
wherein the first drive axle includes a first differential that is coupled to axle shafts;
wherein the first disconnect device includes a splined sleeve mated with an output shaft that is directly coupled to an output interface which is configured to rotationally couple to the differential;
wherein the hydraulic actuation system comprises a hydraulic actuator coupled to the splined sleeve;
wherein the hydraulic actuator is configured to axially translate the splined sleeve in opposing directions to place the hydraulic actuator in an engaged configuration and a disengaged configuration; and
wherein the first disconnect device and the second disconnect device are both commonly enclosed in a transmission housing.

16. The method of claim 15, wherein the first disconnect device includes a spring loaded piston that is compressed in an engaged position.

17. The method of claim 16, further comprising shutting down a motive power source to decrease the pressure in the hydraulic actuation system.

18. The method of claim 17, wherein the motive power source is an internal combustion engine or an electric motor.

19. The method of claim 15, wherein the hydraulic pressure in the hydraulic actuation system is supplied by a regulator pressure valve included in the vehicle transmission.

* * * * *